United States Patent [19]

Friedman

[11] Patent Number: 4,715,955
[45] Date of Patent: Dec. 29, 1987

[54] ULTRAFILTRATION APPARATUS

[75] Inventor: Denis R. Friedman, Acton, Mass.

[73] Assignee: Filtron Technology Corp., Clinton, Mass.

[21] Appl. No.: 944,060

[22] Filed: Dec. 22, 1986

[51] Int. Cl.⁴ ............................................. B01D 13/00
[52] U.S. Cl. ................................... 210/346; 210/486; 210/321.72
[58] Field of Search ...................... 210/346, 433.2, 456, 210/486

[56] References Cited

U.S. PATENT DOCUMENTS 4,430,218 2/1984 Perl et al. ..................... 210/433.2 X Primary Examiner—Frank Spear
Attorney, Agent, or Firm—John E. Toupal; Harold G. Jarcho

[57] ABSTRACT

A filtration apparatus including a filtration module having an axially stacked plurality of filter membrane sheets with the module defining a stack of fluid flow chambers having multi-edged perimeters and disposed on opposite sides of and substantially coextensive with each membrane sheet. Also defined by the module are a plurality of feed passages communicating with alternating ones of the chambers adjacent first axially aligned edges thereof, a plurality of retentate passages communicating with the alternating chambers adjacent to second axially aligned edges thereof opposite to the first edges, and a plurality of filtrate passage means communicating with other ones of the chambers between the alternating ones thereof and with the filtrate passage means entering the other chambers adjacent to either the first or second aligned edges. Also included in the apparatus are a base frame and a pair of parallel plates supported by the frame and movable thereon relative to each other in directions normal thereto. The module is retained between the parallel plates with the direction of movement thereof aligned with the axis of the membrane sheets and one of the plates defines a first channel substantially parallel to and axially aligned with the first edges, a second channel substantially parallel to and axially aligned with the second edges, and a third channel means including one portion substantially parallel to either of the first and second edges and another portion transverse thereto and extending a distance therebetween.

21 Claims, 7 Drawing Figures

ULTRAFILTRATION APPARATUS

BACKGROUND OF THE INVENTION

This invention relates generally to filtration apparatus and, more particularly, to an apparatus employing an exchangeable module retained between parallel plates and comprising a stacked array of ultrafiltration membranes.

Ultrafiltration equipment is required for many applications including the concentration; fractionation and ultrapurification of protein solutions; the depyrogenation of water and intravenous solutions; the desalting of biologicals; and the removal of macromolecules and colloids. A well-known type of ultrafiltration apparatus employs a module comprising a stacked array of ultrafiltration membranes separated by flow accommodating screens and retained between demountable plates. Some of the problems associated with such equipment stem from the requirements for frequent cleaning and replacement of filter modules. One ultrafiltration unit, for example, utilizes fluid flow parts in each of the demountable plates thereby necessitating dismantling of an entire system for each cleaning or filtration module replacement procedure. Other ultrafiltration units require specially designed filter modules and are not compatible for use with commonly available modules. One such unit is disclosed in U.S. Pat. No. 4,430,218.

The object of this invention, therefore, is to provide a more easily used and versatile ultrafiltration device.

SUMMARY OF THE INVENTION

The invention is a filtration apparatus including a filtration module having an axially stacked plurality of filter membrane sheets with the module defining a stack of fluid flow chambers having multi-edged perimeters and disposed on opposite sides of and substantially coextensive with each membrane sheet. The perimeters of the membrane sheets and the chambers are sealed such that fluid flow between adjacent chambers must pass through a membrane sheet straddled thereby. Also defined by the module are a plurality of feed passages communicating with alternating ones of the chambers adjacent first axially aligned edges thereof, a plurality of retentate passages communicating with the alternating chambers adjacent to second axially aligned edges thereof opposite to the first edges, and a plurality of filtrate passage means communicating with other ones of the chambers between the alternating ones thereof and with the filtrate passage means entering the other chambers adjacent to either the first or second aligned edges. Also included in the apparatus are a base frame and a pair of parallel plates supported by the frame and movable thereon relative to each other in directions normal thereto. The module is retained between the parallel plates with the direction of movement thereof aligned with the axis of the membrane sheets and one of the plates defines a first channel substantially parallel to and axially aligned with the first edges, a second channel substantially parallel to and axially aligned with the second edges, and a third channel means including one portion substantially parallel to either of the first and second edges and another portion transverse thereto and extending a distance therebetween. Providing three channels in a one of apair of end plates provides an apparatus which can be easily dismantled for cleaning or module replacement and that arrangement is facilitated by the channel with transversely oriented length portions.

According to certain features of the invention, the first channel is a feed channel communicating with the feed passages, the second channel is a retentate channel communicating with the retentate passages, and the third channel means is a filtrate channel means communicating with the filtrate passage means, and the transverse another channel portion is oriented acutely with respect to a surface of the one plate facing the module. The acutely angled feed channel portions establish a specifically desirable structural arrangement.

According to other features of the invention, the filtrate channel means comprises a first filtrate channel including one portion substantially parallel to the first edges and another portion transverse thereto, and a second filtrate channel including one portion substantially parallel to the second edges and another portion transverse thereto; and the filtrate passage means comprises first filtrate passage means entering the chambers adjacent to the first edges, and second filtrate passage means entering the chambers adjacent to the second edges. The use of first and second filtrate passages and channels increases the throughput of the apparatus.

According to still other features of the invention, the chambers are formed by screen members stacked between the membrane sheets and peripherally sealed thereto, and the membrane sheets and screen members are uniformly dimensioned and axially aligned rectangles. These features provide the module with a particularly desirable geometrical configuration.

In one embodiment of the invention, the opposite ends of the feed channel terminate, respectively, at one side wall of the one plate and the module facing surface thereof; opposite ends of the retentate channel terminate, respectively, at the one side wall and the facing surface thereof; and opposite ends of each filtrate channel terminate, respectively, at the one side wall and the facing surface thereof. This embodiment is useful when fluid connections to only a single side wall of a single end plate are desirable.

In another embodiment of the invention, one end of the feed and retentate channels terminates in the same side wall of the one plate, and one end of each filtrate channel terminates in an opposite side wall of the one plate. This embodiment is useful when fluid connections to opposite side walls of a single end plate are desirable.

According to further features of the invention, the feed passages, the retentate passages, and the filtrate passage means extend axially through the module and are in rectalinear alignment along the first and second edges. This arrangement provides a structurally desirable geometry.

According to yet another feature of the invention, the retentate and filtrate channels undergo only one direction change between their opposite ends. This feature facilitates cleaning of the channels.

In another embodiment of the invention, the first and second channels also each include a portion substantially parallel to either of the first and second edges and another portion transverse thereto and extending a distance therebetween. The additional provision of transverse portions on the first and second channels further enhances the ability to position all fluid flow channels in a single end plate of the apparatus.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
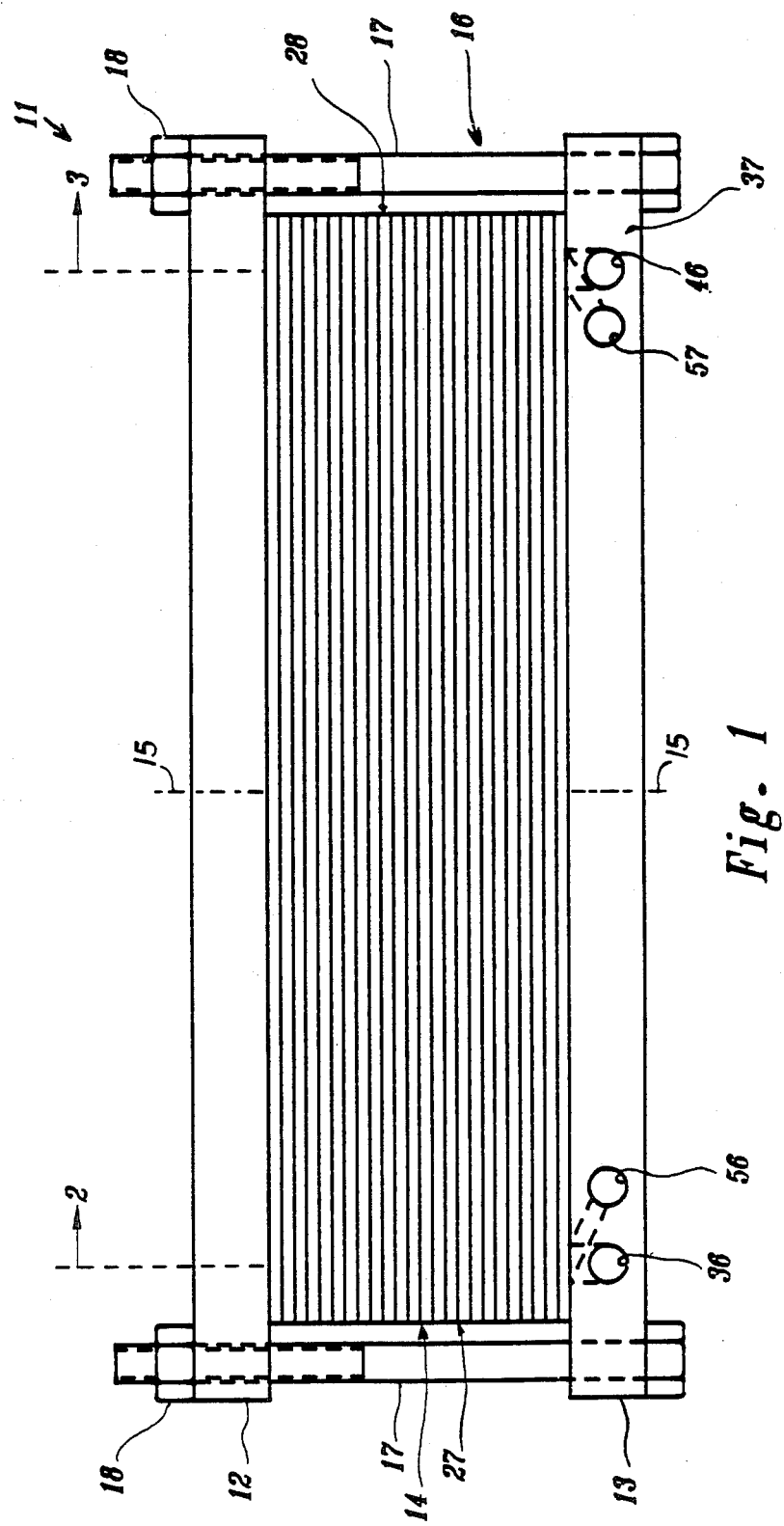
FIG. 1 is a schematic elevational view of a filtration device according to the invention.

The filtration device 11 includes a pair of parallel mounting end plates 12, 13 that straddle and retain an ultra filtration module 14 composed of a plurality of perimeterally aligned, square-shaped components arranged in a longitudinal stacking axis 15. Supporting the plates 12, 13 is a base frame 16 that permits relative movement therebetween along the longitudinal axis 15 of the filtration module 14. The base frame 16 includes a plurality of bolts 17 that extend through openings in the corners of the plates 12, 13. Nuts 18 on the ends of the bolts 17 can be loosened to allow separation of the plates 12, 13 and removal of the module 14 or can be tightened to exert longitudinal forces that securely retain the module 14 in position between the plates 12, 13.

As shown in FIGS. 2-5, the filtration module 14 is formed by alternating square-shaped screen members 21a, 21b and ultrafiltration membrane sheets 22 that are perimeterally aligned along the longitudinal axis 15. The outer margins of the screen members 21a, 21b and membrane sheets 22 are sealed with a suitable epoxy 23 such that the screens 21 form closed chambers 24 straddling each of the membrane sheets 22. Defined by the screen members 21a, 21b and the membrane sheets 22 are axially directed feed passages 25, 26 located adjacent to first edges 27 (FIG. 4). thereof. Similarly defined by the screen members 21a, 21b and the membrane sheets 22 adjacent to opposite second edges 28 (FIG. 4) thereof are axially directed retentate passages 29, 30. A first axially directed filtrate passage 31 (FIG. 4) extends through the stacked screen members 21a, 21b and membrane sheets 22 adjacent to the first edges 26 thereof and between and parallel to the feed passages 25, 26. Similarly formed adjacent to the opposite edges 27 of the screens 21 and membrane sheets 22 is a second axially directed filtrate passage 32 (FIG. 4) parallel to and between the retentate passages 29, 30.

Figure 4:
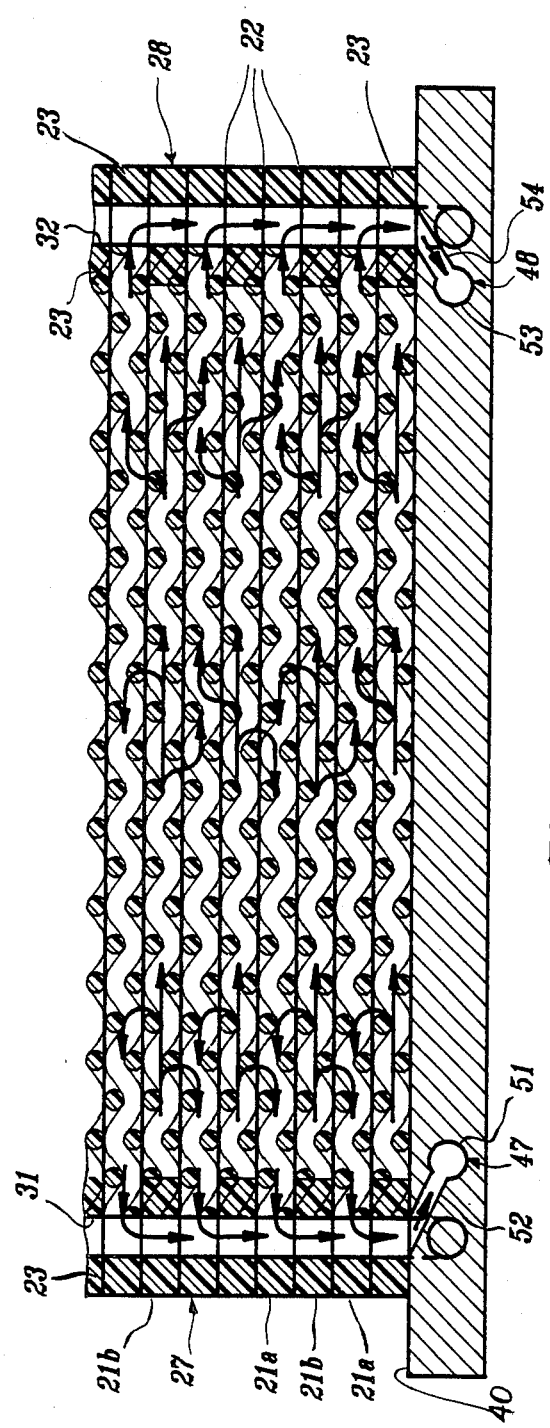
FIG. 4 is a schematic cross-sectional view taken along lines 4—4 of FIG. 2.

Formed in the end plate 13 is a feed channel 33 having a longitudinal portion 35 extending parallel to the edges 27 and terminating with an inlet port 36 in a sidewall 37. The feed passage portion 35 joins upwardly directed portions 38, 39 that terminate with openings in an end wall 37 of the plate 13 facing the module 14. Communicating with the portions 38, 39 of the feed channel 33, respectively, are the feed passages 25, 26. Also formed in the end plate 13, is a retentate channel 41 shown most clearly in FIG. 3. The retentate channel 41 includes a longitudinal portion 42 extending parallel to the longitudinal portion 35 of the feed channel 33 and upwardly directed portions 43, 44 that communicate, respectively, with the retentate passages 29, 30. An outer end of the retentate chanel portion 42 terminates with an outlet port 46 in the side wall 37 of the end plate 13. Additionally formed in the end plate 13 are a first filtrate channel 47 and a second filtrate channel 48 shown in FIG. 4. The first filtrate channel 47 includes a longitudinal portion 51 that is parallel and adjacent to the feed 33, and a transverse portion 52 that extends between the edges 27 and 28 and communicates with the filtrate passage 31. Similarly formed is a second filtrate channel 48 having a longitudinal portion 53 that is parallel and adjacent to the retentate channel 41 and a transverse portion 54 that extends between the edges 27 and 28 and communicates with the filtrate passage 32. As shown in FIG. 4, the transverse filtrate channel portions 52, 54 from acute angles with an upper surface 55 of the end plate 13. Outer ends of the longitudinal filtrate channel portions 51, 53 terminate, respectively, with outlet ports 56, 57 in the sidewall 37 of the end plate 13.

Figure 2:
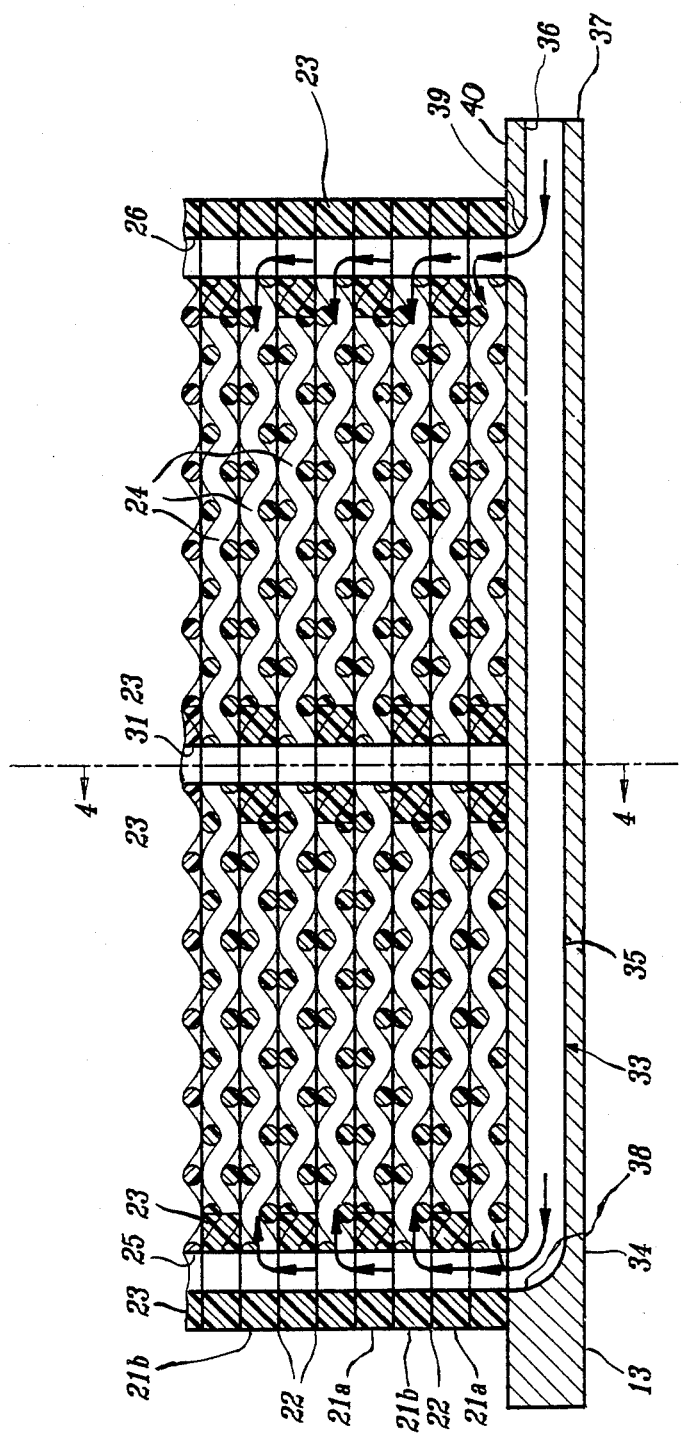
FIG. 2 is a schematic cross-sectional view taken along lines 2—2 of FIG. 1.
Figure 3:
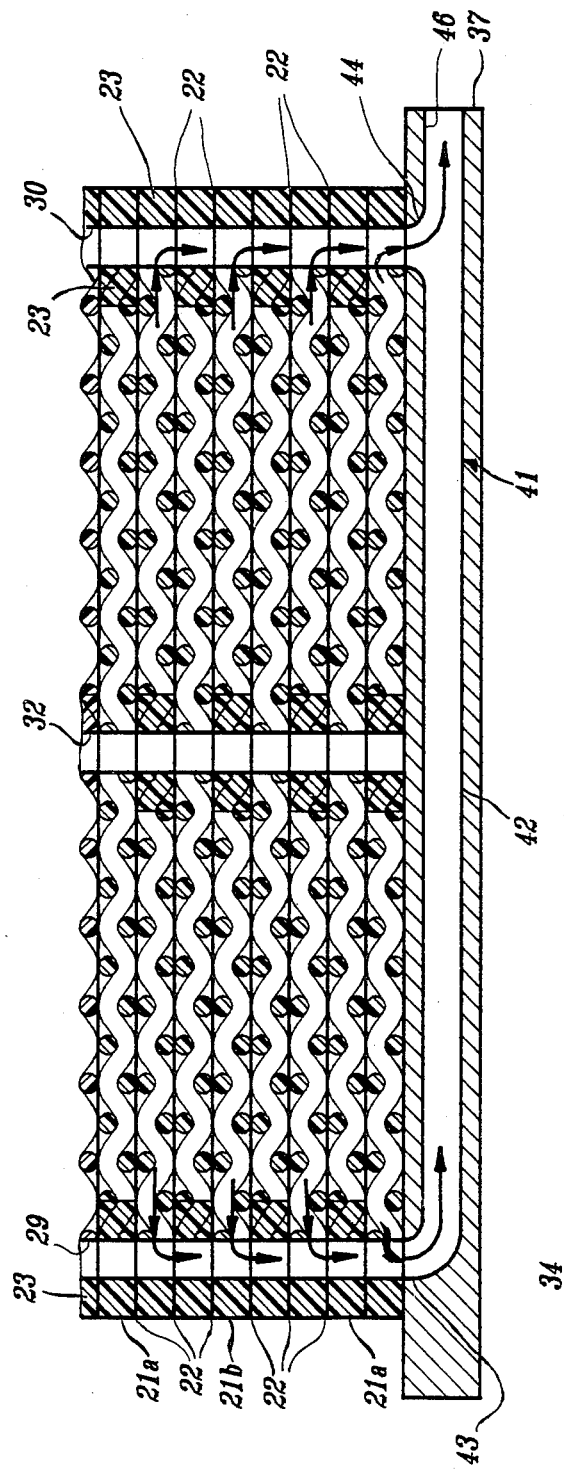
FIG. 3 is a schematic cross-sectional view taken along lines 3—3 of FIG. 1.
Figure 5:
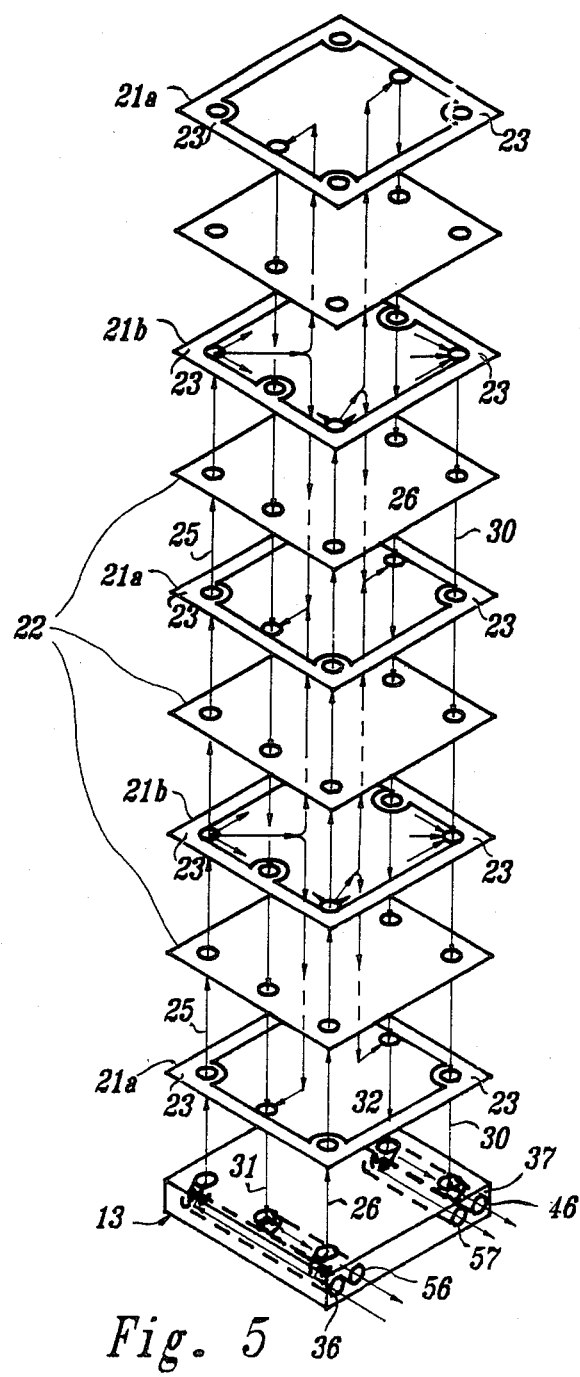
FIG. 5 is an exploded partial view of the device shown in FIGS. 1-4.

As shown in FIGS. 2 and 5, the portions of alternate screen members 21a that partially define the feed passages 25 are sealed with the adhesive 23. Accordingly, no fluid communication exists between the feed passages 25 and the chambers 24 defined by the alternate screen members 21a. However, the openings in the alternating screen members 21b that partially form the feed passages 25 are not sealed from the chambers 24 therein so as to allow for fluid communication therebetween. Similarly, the openings partially forming the retentate passages 26 in the alternating screen members 21a are sealed from the chambers 24 therein while the openings partially forming the retentate passages 26 in the alternating screen members 21b are not sealed from the chambers 24 formed thereby and so as to allow fluid communication therebetween. Thus, a fluid flow path exists between the feed passages 25, 26 and adjacent one edge 27 of the filter module 14 and the retentate passages 29, 30 adjacent the opposite edge 28 thereof via the chambers 24 formed by the alternating screen members 21b.

As shown most clearly in FIGS. 4 and 5, the chambers 24 formed by the alternating screen members 21a communicate with the openings therein that partially define the filtrate passages 31, 32. However, the chambers 24 formed by the alternating screen member 21b are sealed by the adhesive 23 from the openings therein that partially define the filtrate passages 31, 32. In addition, the adhesive 23 also seals the areas of the membrane sheets 22 directly surrounding the openings therein that partially define the feed passages 25, 26, the retentate passages 28, 29 and the filtrate passages 31, 32 so as to prevent fluid flow therebetween.

OPERATION

During use of the device 11, the nuts 18 are loosened to permit separation of the end plates 12, 13 and insertion of a predetermined ultrafiltration module 14 therebetween. The nuts 18 then are tightened to securely seal the module 14 between the end plates 12 and 13. Suitable fluid handling tubing and couplings (not shown) are employed to connect the inlet port 36 to a source of pressurized fluid to be filtered, and the outlet port 46 to a collection vessel for a retentate resulting from the filter process, and the outlet ports 56, 57 to a collection vessel for a filtrate produced by the filtration process. Pressurized fluid introduced through the inlet port 36 flow through the longitudinal and transverse portions 37–39 of the feed channel 33, the feed passages 25, 26 and into the chambers 24 formed by the alternating screen members 21b. A filtrate portion of the fluid entering the chambers 24 formed by the alternating screen members 21b is forced through the filter membrane sheets 22 on opposite sides thereof into the adjacent chambers 24 formed by the alternating screen members 21a. That filtrate portion flows from the chambers 24 of the alternating screen members 21a into the filtrate passages 31, 32 adjacent to, respectively, opposite edges 27, 28 of the ultrafiltration module 14. The filtrate entering the filtrate passage 31 flows through the transverse and parallel portions 52, 51 of the filtrate channel 47 and exits through the outlet port 56. Similarly, the filtrate entering the filtrate passage 32 passes through the transverse and longitudinal portions 54, 53 of the filtrate channel 48 and exits through the outlet port 57. The retentate portion of the fluid within the chambers 24 of the alternating screen members 21b flows between the feed passages 25, 26 to the retentate passages 28, 29 and into the transverse portions 43, 44 and the longitudinal portion 42 of the retentate channel 41 before exiting through the outlet port 46. During the filter process, the screen members 21a, 21b create turbulent flow within the chambers 24 that function to clean the surfaces of the membrane sheets 22 and thereby enhance the efficiency of the filtration process.

Figure 6:
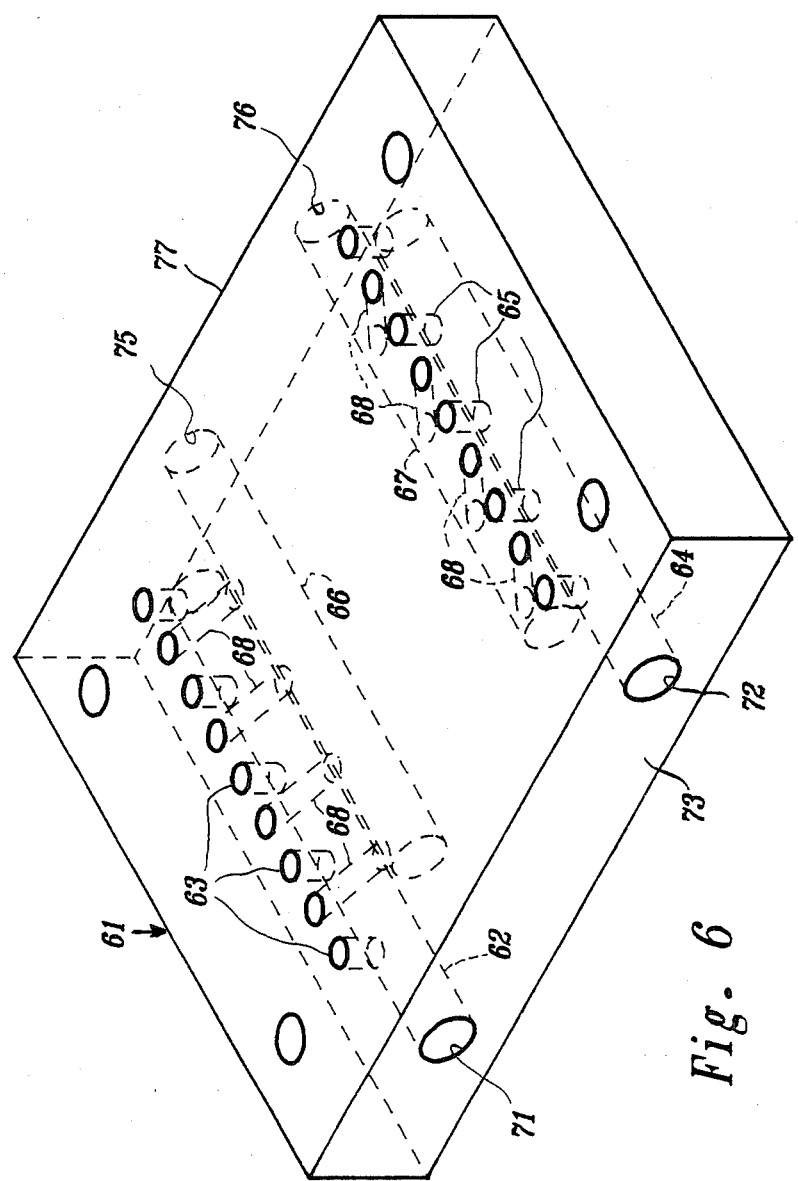
FIG. 6 is a schematic perspective view of a modified mounting plate embodiment of the invention.

It should be noted that the apparatus depicted in FIGS. 1–5 is merely exemplary and that various dimensions have been exaggerated for purposes of illustrative clarity. For the same reasons, the number of feed, retentate and filtrate passages 25, 26, 31, 32, 29 and 30 have been limited as shown in FIGS. 1–5 while in most cases their number would be substantially increased. As shown in the modified embodiment of FIG. 6, for example, an end plate 61 is provided with a feed channel 62 having five transverse portions 63, a retentate channel 64 having five transverse portions 65, and a pair of filtrate channels 66, 67 each having four transverse portions 68. The end plate 61 would be used in the same manner as described above for the end plate 13 but would accommodate an ultrafiltration module (not shown) having five feed passages, five retentate passages, and eight filtrate passages. An additional modification in the end plate 61 is that ends of the feed and retentate channels 62 and 64, respectively, terminate in ports 71 and 72 in one side wall 73 of the end plate 61 while the filtrate channels 66 and 67 terminate, respectively, in outlet ports 75 and 76 in an opposite end wall 77 of the end plate 61. Use of the end plate 61 would by desirable when fluid handling equipment would be most easily positioned on opposite sides of the ultrafiltration apparatus.

Figure 7:
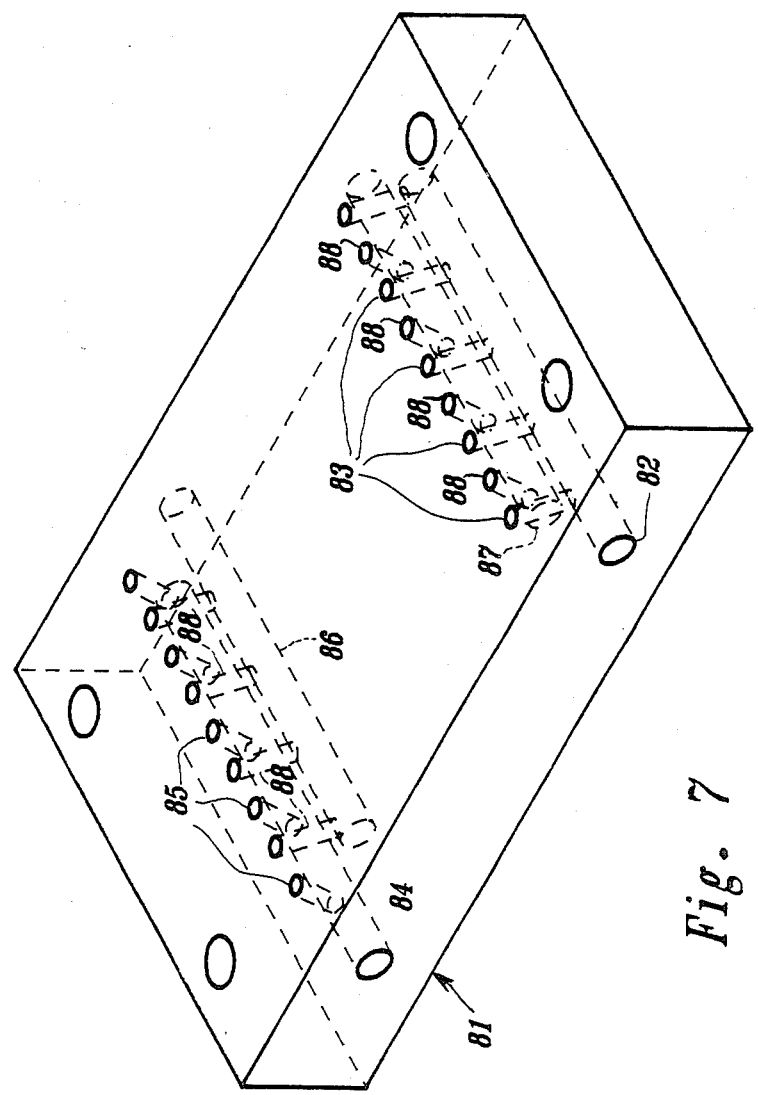
FIG. 7 is a schematic perspective view of another modified mounting plate embodiment of the invention.

FIG. 7 shows another end plate embodiment 71 for use when fluid connections are desired at opposite sides of the apparatus. As in the embodiment of FIG. 6, the end plate 81 is provided with a feed channel 82 having five transverse portions 83, a retentate channel 84 having five transverse portions 85, and a pair of filtrate channels 86, 87, each having four transverse 88. However, in this embodiment the transverse portions 83 and 85 of, respectively, the feed and retentate channels 82 and 84 in addition to the filtrate transverse portions 88 entered acutely from an upper surface 89 of the end plate 81 and in a direction between opposite edges of an ultrafiltration module retained thereby. This embodiment further enhances the ability to separate the filtrate channels 86 and 87 from the feed and retentate channels 82 and 84 in a single end plate 81. Use of the end plate 61 would be in a manner similar to that described above.

Obviously, many modifications and variations of the present invention are possible in light of the above teachings. It is to be understood, therefore, that the invention can be practiced otherwise than as specifically described.

What is claimed:

1. A filtration apparatus comprising:
a filtration module comprising an axially stacked plurality of filter membrane sheets, said module defining a stack of fluid flow chambers having multi-edged perimeters and disposed on opposite sides of and substantially coextensive with each said membrane sheet, the perimeters of said membrane sheets and said chambers being sealed such that fluid flow between adjacent chambers must pass through a said membrane sheet straddled thereby; said module defining a plurality of feed passages communicating with alternating ones of said chambers adjacent first axially aligned edges thereof, a plurality of retentate passages communicating with said alternating chambers adjacent to second axially aligned edges thereof opposite to said first edges, and a plurality of filtrate passage means communicating with other ones of said chambers between said alternating ones thereof, said filtrate passage means entering said other chambers adjacent to either said first or second aligned edges;
a base frame means; and
a pair of parallel plates supported by said frame means and movable thereon relative to each other in directions normal thereto, said module being retained between said parallel plates with said direction of movement thereof aligned with the axis of said membrane sheets; and wherein one of said plates defines a first channel substantially parallel to and axially aligned with said first edges, a second channel substantially parallel to and axially aligned with said second edges, and a third channel means including one portion substantially parallel to either of said first and second edges and another portion transverse thereto and extending a distance therebetween.

2. A filtration apparatus according to claim 1 wherein said first channel is a feed channel communicating with said feed passages, said second channel is a retentate channel communicating with said retentate passages, and said third channel means is a filtrate channel means communicating with said filtrate passage means.

3. A filtration apparatus according to claim 2 wherein said another portion is oriented acutely with respect to a surface of said one plate facing said module.

4. A filtration apparatus according to claim 2 wherein said filtrate channel means comprises a first filtrate channel including one portion substantially parallel to said first edges and another portion transverse thereto, and a second filtrate channel including one portion substantially parallel to said second edges and another portion transverse thereto; and said filtrate passage means comprises first filtrate passage means entering said chambers adjacent to said first edges, and second filtrate passage means entering said chambers adjacent to said second edges.

5. A filtration apparatus according to claim 4 wherein said another filtrate channel portions are oriented acutely with respect to a surface of said one plate facing said module.

6. A filtration apparatus according to claim 1 wherein said chambers are formed by screen members stacked between said membrane sheets and peripherally sealed thereto.

7. A filtration apparatus according to claim 6 wherein said membrane sheets and said screen members are uniformly dimensioned and axially aligned rectangles.

8. A filtration apparatus according to claim 7 wherein opposite ends of said feed channel terminate, respectively, at a side wall of said one plate and said surface thereof; opposite ends of said retentate channel terminate, respectively, at a side wall of said one plate and said surface thereof; and opposite ends of each filtrate channel terminate, respectively, at a side wall of said one plate and said surface thereof.

9. A filtration apparatus according to claim 8 wherein one said end of each said feed, retentate and filtrate channels terminate in the same side wall of said one plate.

10. A filtration apparatus according to claim 8 wherein one said end of each said feed and retentate channels terminates in the same side wall of said one plate, and one said end of each of said filtrate channels terminates in a side wall of said one plate opposite to said same side wall.

11. A filtration apparatus according to claim 1 wherein said feed passages, said retentate passages, and said filtrate passage means extend axially through said module and are in rectalinear alignment along said first and second edges.

12. A filtration apparatus according to claim 2 wherein between said opposite ends; said feed, retentate and filtrate channels undergo only one direction change.

13. A filtration apparatus according to claim 1 wherein said first and second channels each include a portion substantially parallel to either of said first and second edges and another portion transverse thereto and extending a distance therebetween.

14. A filtration apparatus according to claim 13 wherein said first channel is a feed channel communicating with said feed passages, said second channel is a retentate channel communicating with said retentate passages, and said third channel means is a filtrate channel means communicating with said filtrate passage means.

15. A filtration apparatus according to claim 14 wherein said another channel portions are oriented acutely with respect to a surface of said one plate facing said module.

16. A filtration apparatus according to claim 14 wherein said filtrate channel means comprises a first filtrate channel including one portion substantially parallel to said first edges and another portion transverse thereto, and a second filtrate channel including one portion substantially parallel to said second edges and another portion transverse thereto; and said filtrate passage means comprises first filtrate passage means entering said chambers adjacent to said first edges, and second filtrate passage means entering said chambers adjacent to said second edges.

17. A filtration apparatus according to claim 16 wherein said chambers are formed by screen members stacked between said membrane sheets and peripherally sealed thereto.

18. A filtration apparatus according to claim 17 wherein said membrane sheets and said screen members are uniformly dimensioned and axially aligned rectangles.

19. A filtration apparatus according to claim 1 wherein said another portion is oriented acutely with respect to a surface of said one plate facing said module.

20. A filtration apparatus according to claim 19 wherein said chambers are formed by screen members stacked between said membrane sheets and peripherally sealed thereto.

21. A filtration apparatus according to claim 20 wherein said membrane sheets and said screen members are uniformly dimensioned and axially aligned rectangles.

* * * * *